United States Patent [19]

Imamura

[11] Patent Number: 5,462,426
[45] Date of Patent: Oct. 31, 1995

[54] EXTRUDER

[75] Inventor: Yukio Imamura, Hiroshima, Japan

[73] Assignee: The Japan Steel Works, Ltd., Tokyo, Japan

[21] Appl. No.: 313,776

[22] Filed: Sep. 28, 1994

[30] Foreign Application Priority Data

Sep. 29, 1993 [JP] Japan .................................. 5-242598

[51] Int. Cl.$^6$ .............................. B29B 7/38; B29B 7/74
[52] U.S. Cl. ..................... 425/190; 425/204; 425/205; 425/209; 366/77; 366/79; 366/131
[58] Field of Search .................... 425/205, 190, 425/204, 209; 360/77, 79, 131

[56] References Cited

U.S. PATENT DOCUMENTS

| | | | |
|---|---|---|---|
| 3,700,374 | 10/1972 | Matsuoka et al. | 366/77 |
| 4,075,712 | 2/1978 | Geyer | 366/79 |
| 4,310,251 | 1/1982 | Scharer et al. | 366/77 |
| 4,501,498 | 2/1985 | McKelvey | 366/79 |
| 4,707,139 | 11/1987 | Valenzky et al. | 425/145 |
| 4,750,841 | 6/1988 | Hicks | 366/79 |
| 4,890,996 | 1/1990 | Shimizu | 425/205 |
| 5,310,256 | 5/1994 | Boden | 425/205 |

FOREIGN PATENT DOCUMENTS 3616761  7/1987  Germany.

OTHER PUBLICATIONS

Database WPI Week 8020, Derwent Publications Ltd., London, GB; AN 80-35814 & JP-A-52030751 *abstract*.
Patent Abstracts of Japan, vol. 12, No. 33 (C-472) Jan. 30, 1988 & JP-A-62182136 Aug. 10, 1987 *abstract*.
Patent Abstracts of Japan, vol. 17, No. 679 (M-1527) Dec. 14, 1993 & JP-A-05228921 Sep. 7, 1993 *abstract*.

*Primary Examiner*—Khanh P. Nguyen
*Attorney, Agent, or Firm*—Sughrue, Mion, Zinn, Macpeak & Seas

[57] ABSTRACT

An extruder in which the joint between the downstream, forward end portion of a cylinder and a gear pump is always kept tight, so that molten resin material is prevented from leaking out. As the main discharge port of a diverter valve is prevented from shifting from the inhalation port of the gear pump at the joint therebetween, the flow passage at the joint is always smooth without a spot where the molten resin material collects. The quality of resin products thus becomes stable.

4 Claims, 4 Drawing Sheets

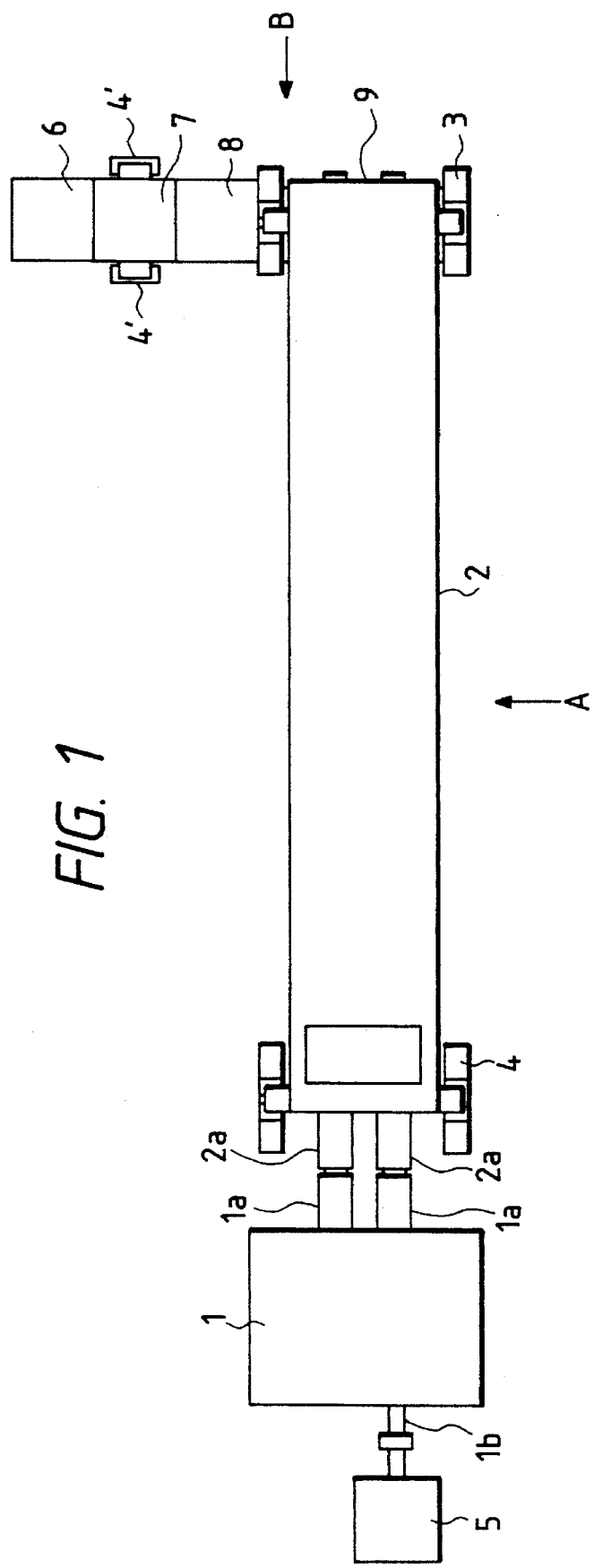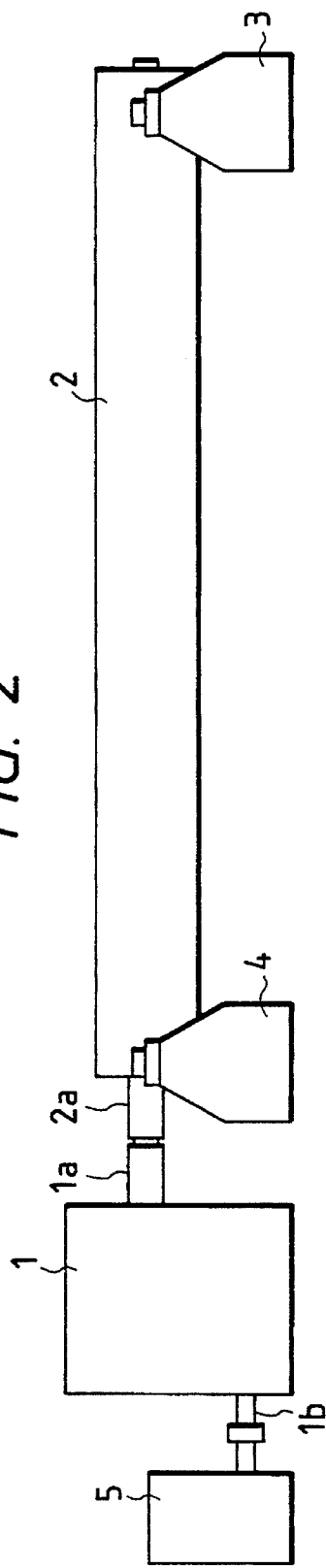

EXTRUDER

BACKGROUND OF THE INVENTION

1. Field of the Invention

The present invention relates to a large-sized single- or multiple-screw resin material extruder having a gear pump at the leading end of a cylinder having built-in screws, wherein the direction of the flow passage of the gear pump is set perpendicular to the direction of the flow passage of the cylinder.

2. Related Art

FIG. 7 and 8 are a top and a side view of a conventional resin material extruder in which the direction of the flow passage of a gear pump is set perpendicular to that of the flow passage of a cylinder.

More specifically, the upstream end portion of a cylinder 2 having built-in screws is coupled to a speed reducer 1 to which a motor 5 is coupled and a gear pump 8 is coupled via a diverter valve 9 to the downstream, forward end of the cylinder 2 in a direction perpendicular to the flow passage of the cylinder 2. Further, a screen unit 7 and a granulating unit 6 are successively coupled to the gear pump 8. The speed reducer 1 is securely positioned.

The upstream end portion of the cylinder 2 is securely coupled to the speed reducer 1. The cylinder 2 is also movably supported with respective supports 4 at two places on both sides thereof in the longitudinal direction. The diverter valve 9 is securely coupled to the forward delivery opening of the cylinder 2.

The main discharge port of the diverter valve 9 is opened toward one side of the cylinder 2.

The gear pump 8, the screen unit 7 and the granulating unit 6 are coupled together successively and securely. The screen unit 7 is movably supported with respective supports 4' on both sides thereof in the direction of the flow passage, that is, in the direction perpendicular to the flow passage of the cylinder 2. The inhalation port of the gear pump 8 is securely coupled to the main discharge port of the diverter valve 9.

The inhalation port of the gear pump 8 and the main discharge port of the diverter valve 9 are coupled together under the cooling condition in such a way that, in consideration of the thermal expansion of the cylinder 2 at the time of normal operation of the extruder, the main discharge port of the diverter valve 9 is slightly shifted to the upstream side of the cylinder 2 to make it slidable and movable as the temperature of the cylinder 2 varies so as to make both the ports fit in with each other at the time of the normal operation during which the extruder is heated up to a set temperature.

The extruder thus constructed is first heated up to a predetermined temperature when it is operated. The extruder thus heated then kneads and melts the resin material supplied into the cylinder 2 having the rotatable screws. The molten resin material is pressurized by the gear pump 8 via the diverter valve 9 and delivered via the screen unit 7 into the granulating unit 6 where the molten resin material is granulated and solidified.

When the cylinder 2 is heated up, its total length becomes greater than that in cold condition as it elongates because of thermal expansion. However, the elongation totally appears in the downstream, forward end portion of the cylinder 2 since the upstream end portion thereof is securely coupled to the speed reducer 1 which is also securely disposed. The cylinder 2 thus elongates in the direction of its downstream, forward end portion.

As a result, the main discharge port of the diverter valve 9 which has shifted from the inhalation port of the gear pump 8 in cold condition fits the latter, so that the normal fluidity of the molten resin material is obtained.

The diverter valve 9 is equipped with a sub-discharge port for discharging the molten resin material outside when it is found inferior or unstable in quality at the outset of the operation of the extruder, for example, and used to switch the main discharge port to the sub-discharge port and vice versa as occasion demands.

The screen unit 7 separates alien substances by filtering the molten resin material.

However, the joint between the main discharge port of the diverter valve 9 and the inhalation port of the gear pump 8 is hardly sealed up even if a seal member is used because the former is fitted to the latter slidably and movably. Consequently, the molten resin material flowing inside may leak out through the joint. Moreover, the elongation of the cylinder changes from time to time as the heat-up temperature of the cylinder varies with the resin material, the operating condition and the like, and as the temperature of the cylinder also varies with the atmospheric temperature.

Therefore, the main discharge port of the diverter valve 9 needs to be always slidably coupled to the inhalation port of the gear pump 8 at the joint. In other words, the joint is hard to be locked securely and tightly after the cylinder is heated up.

If the joint is locked securely and tightly after the cylinder is heated up, the equipment may be gouged out at the joint as the elongation of the cylinder varies and the arrangement of the equipment may be badly affected thereby. A gap, if produced, at the joint may also cause the molten resin material to leak out.

As the temperature of the cylinder varies, moreover, the elongation of the cylinder rarely agrees to what has been estimated and it is often the case with the diverter valve whose main discharge port falls in discord with the inhalation port of the gear pump.

The molten resin material tends to collect in such a discordant spot and what has stayed thereat for hours becomes inferior in quality, thus causing the quality of granulated resin products to be deteriorated as the molten resin material inferior in quality is allowed to mix up.

SUMMARY OF THE INVENTION

In order to solve the foregoing problems, it is an object of the present invention to provide an extruder designed to stabilize the quality of resin products by tightly locking the joint between the downstream, forward end portion of a cylinder and a gear pump via a diverter valve so as to prevent molten resin material from leaking out of the joint. The object of the present invention is accomplished by providing an extruder at least comprising a speed reducer, a cylinder having built-in screws coupled to the speed reducer as those which can be driven thereby, and a gear pump coupled to the downstream, forward end portion of the cylinder, the direction of the flow passage of the gear pump being set perpendicular to that of the flow passage of the cylinder, wherein the downstream, forward end portion of the cylinder is securely supported and wherein the upstream side thereof is supported movably in the direction of the flow passage of the cylinder.

The extruder is arranged so that the upstream end portion of the cylinder is made movable in the direction of the flow passage of the cylinder with respect to the speed reducer.

The extruder is also arranged so that the position where the downstream, forward end portion of the cylinder is securely supported is maintained on the axis of the gear pump in the direction of the flow passage thereof.

In the extruder according to the present invention, the cylinder thus heated up totally elongates onto its upstream side.

No force is applied in the direction of the flow passage of the cylinder at the joint between the downstream, forward end portion of the cylinder and the gear pump. Therefore, no gouging force or action is produced at the joint.

BRIEF DESCRIPTION OF THE DRAWINGS

FIG. 1 is top view of an extruder of the present invention;

FIG. 2 is a side view of the extruder of the present invention;

DETAILED DESCRIPTION OF THE PREFERRED EMBODIMENTS

Referring to the accompanying drawings, a detailed description will subsequently be given of an embodiment of the present invention.

Figure 3:
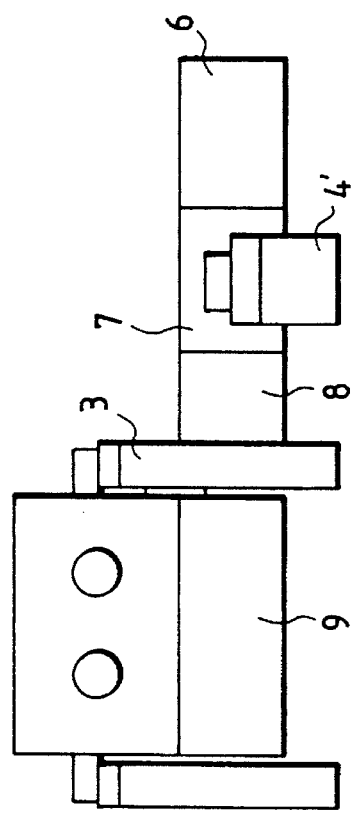
FIG. 3 is a right side view of the extruder of the present invention.
Figure 4:
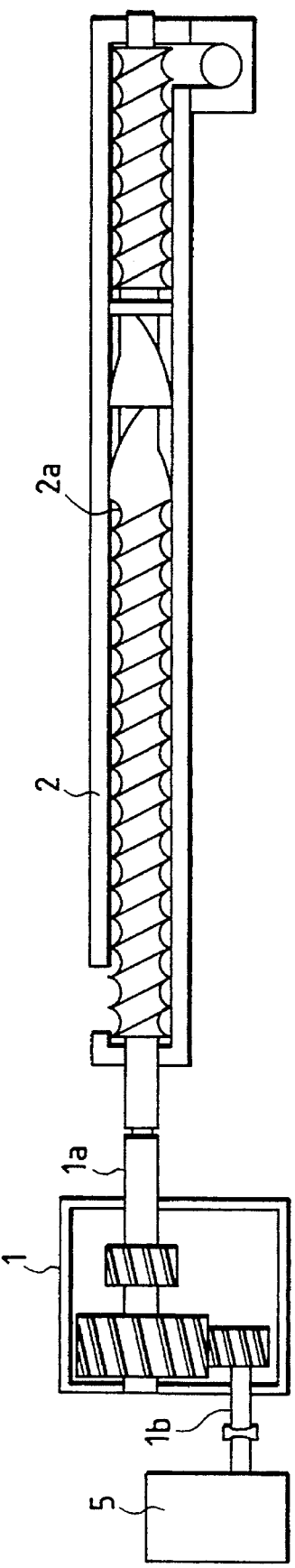
FIG. 4 is an internal structural drawing of the extruder of the present invention.
Figure 5:
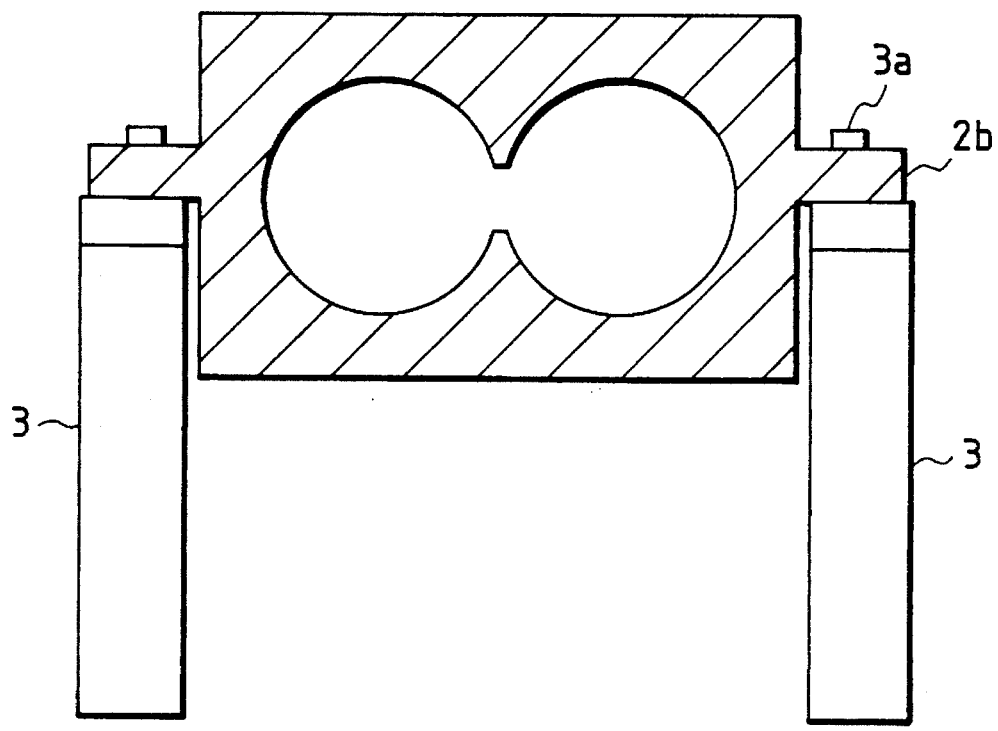
FIG. 5 is a diagram illustrating cylinder-locking supports.

FIG. 1 is a top view of an extruder embodying the present invention; FIG. 2 a side view of the extruder as viewed from the direction of an arrow A of FIG. 1; FIG. 3 a side view of the extruder as viewed from the direction of an arrow B of FIG. 1; FIG. 4 an internal structural drawing of the extruder of FIG. 2; FIG. 5 a diagram illustrating the fixed supports of a cylinder; and FIG. 6 a diagram illustrating the slidable supports of the cylinder. In these drawings, like reference characters designate like or corresponding parts of the conventional extruder referred to herein.

The extruder according to the present invention comprises a speed reducer 1, a cylinder 2, a diverter valve 9 and a gear pump 8.

The speed reducer 1 is coupled to the cylinder 2 so that its output shafts 1a are capable of rotatably driving the respective built-in screws 2a located in the upstream end portion of the cylinder 2 and also capable of sliding in the axial direction. The upstream end portion of the cylinder 2 is not directly coupled to the speed reducer 1 but placed with a space therebetween, whereas the downstream end side thereof is coupled via the diverter valve 9 to the gear pump 8 in a direction perpendicular to the flow passage of the cylinder 2. The space between the upstream end portion of the cylinder 2 and the speed reducer 1 is wide enough to absorb the elongation of the cylinder 2 due to thermal expansion at the time it is heated up. According to this embodiment, the diverter valve 9 is placed in the lower part of the downstream, forward end portion of the cylinder 2. There are also provided an inhalation port corresponding to the downward discharge port of the cylinder 2, a main discharge port corresponding to the inhalation port of the gear pump, and a sub-discharge port opening outward (these ports being not shown in detail), so that a three-way switching function is offered. The diverter valve 9 is not necessarily a component element essential to this extruder and the gear pump 8 may be coupled directly to the downstream, forward end portion of the cylinder 2 instead.

A motor 5 is coupled to the input shaft 1b of the speed reducer 1 as what can be driven thereby.

Further, a screen unit 7 and a granulating unit 6 are successively coupled and securely locked together on the delivery opening side, that is, the downstream side of the gear pump 8 set perpendicular to the flow passage of the cylinder 2.

The speed reducer 1 and the motor 5 are disposed so that their positions are fixed onto a bed.

Supports 3, 4 are then used to support the downstream, forward end portion and at least upstream, end portion of the cylinder 2, respectively.

The supports 3, 4 are also used to support support-lugs 2b on both sides of the cylinder 2. The supports 3 for supporting the downstream, forward end portion of the cylinder 2 securely support the support-lugs 2b on the extended line of the axis in the direction of the flow passage of the gear pump 8. Referring to FIG. 5 showing an embodiment of the present invention, bolts 3a anchor the longitudinal movement of the cylinder 2 to the respective supports 3. In this case, the support 3 on the side of the gear pump 8 stands straddling the joint between the cylinder 2 and the gear pump 8.

Figure 6:
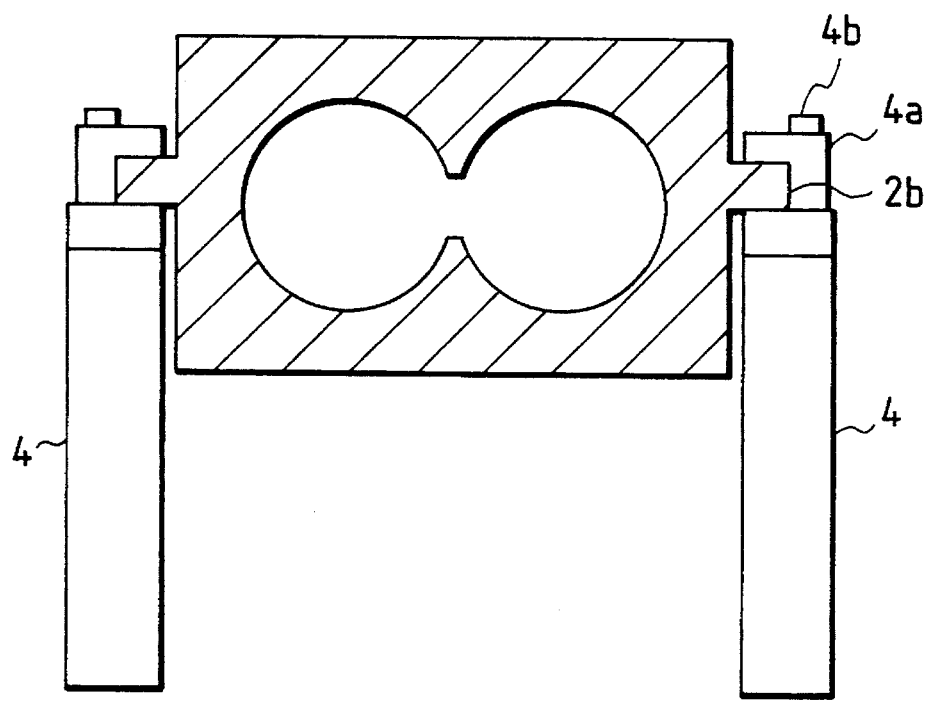
FIG. 6 is a diagram illustrating cylinder-sliding supports.
Figure 7:
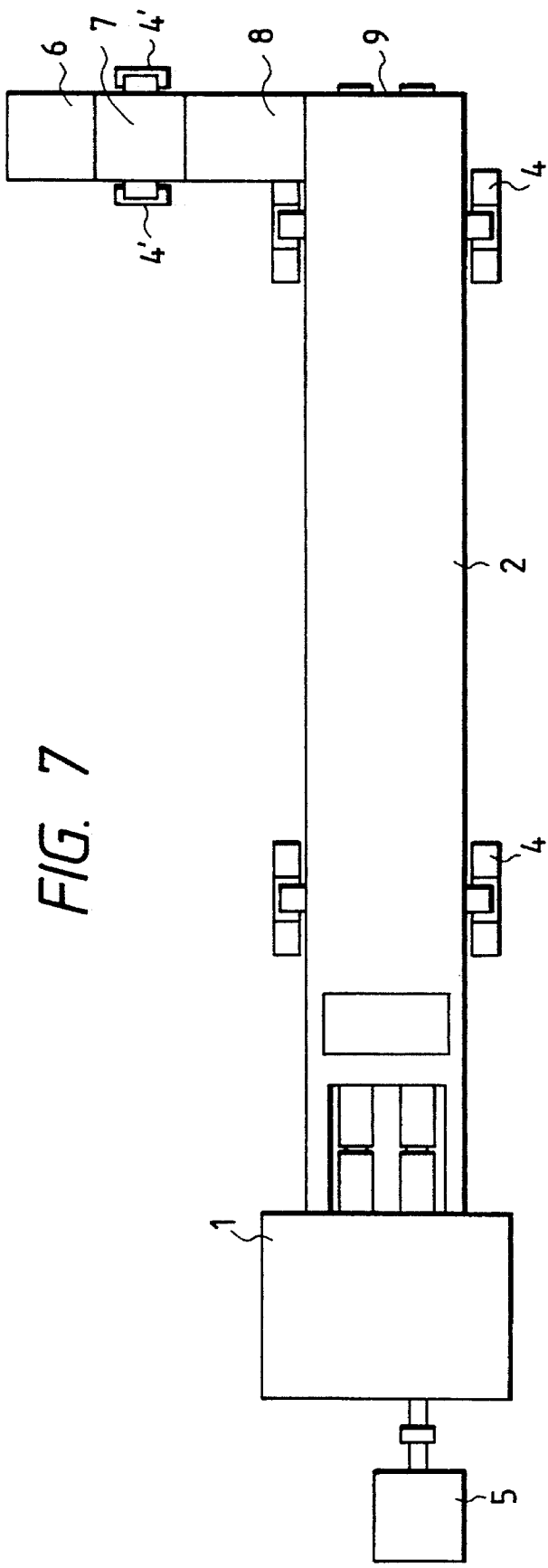
FIG. 7 is a top view of a conventional extruder.
Figure 8:
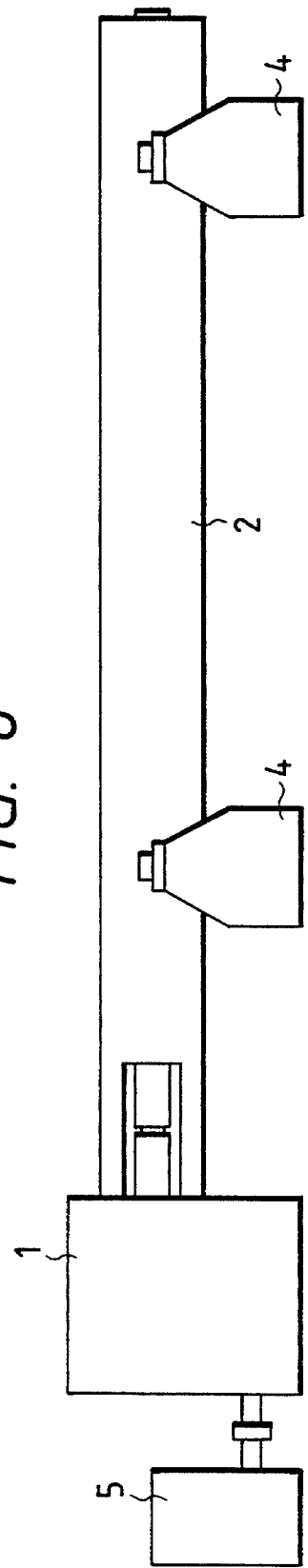
FIG. 8 is a side view of the conventional extruder.

On the other hand, the supports 4 for supporting the upstream side of the cylinder 2 slidably support the cylinder 2 so as to make it movable in the longitudinal direction. Referring to FIG. 6 showing another embodiment thereof, each lug 2b for supporting the cylinder 2 is provided with a small gap in both vertical and horizontal directions and held with a guide member 4a and a bolt 4b.

The gear pump 8, the screen unit 7 and the granulating unit 6 that are coupled together and integrally arranged are slidably supported by supports 4' installed on both sides of the screen unit 7 to make them movable in the axial direction of the equipment like the example shown in FIG. 6.

The extruder thus constructed is first heated up to a predetermined operating temperature when it is operated.

The extruder thus heated then kneads and melts the resin material supplied into the cylinder 2 having the rotatable screws. The molten resin material is pressurized by the gear pump 8 via the diverter valve 9 and delivered via the screen unit 7 into the granulating unit 6 where the molten resin material is granulated and solidified.

When the molten resin material is found inferior or unstable in quality at the outset of the operation of the extruder, the diverter valve 9 discharges the molten resin material from the sub-discharge port so that the molten resin material stable in quality may be discharged from the main discharge port into the gear pump 8. In a case where no diverter valve 9 is provided, one component unit is detached from another at one place between the cylinder 2 and the granulating unit 6 so as to discharge the molten resin material outside.

The screen unit 7 separates alien substances by filtering the molten resin material.

When the cylinder 2 is heated up, its total length becomes greater than that in cold condition as it elongates because of thermal expansion. Since the supports 3 are used to support the support-lugs 2b in the downstream, forward end portion of the cylinder 2 securely to stop the cylinder 2 from moving in the longitudinal direction, the cylinder 2 is caused to elongates upstream along the guide members 4a of the supports 4. Even though the heat-up temperature varies, the cylinder 2 elongates upstream in proportion to the heat-up temperature. Although the rotatable built-in screws 2a of the cylinder 2 elongate likewise, the elongation of the screws 2a is absorbed by the combination of the output shafts 1a of the speed reducer 1 and the screws 2a in the upstream end portion of the cylinder 2 as they are slidably coupled together in the axial direction.

Moreover, the gear pump 8, the screen unit 7 and the granulating unit 6 also undergo thermal expansion when heated up as they are coupled together to form an integral part. However, the supports 4' provided on both sides of the screen unit 7 cause the integral part to elongate in the direction of the granulating unit 6 since the joint between the gear pump 8 and the diverter valve 9 in the downstream, forward end portion of the cylinder 2 is locked.

In other words, only perpendicular force is applied to the joint surface where the gear pump 8 is coupled to the downstream, forward end portion of the cylinder 2 securely and perpendicularly, so that the joint is always kept tight without shifting laterally.

With respect to the support-lugs 2b in the downstream, forward end portion of the cylinder 2, it is preferred that one of them (as what is preferably positioned on the side of the gear pump 8) is completely locked, whereas the other one is used to not only lock the cylinder 2 longitudinally in consideration of its thermal expansion but also make it movable in a direction perpendicular to the longitudinal direction.

As set forth above, the joint between the downstream, forward end portion of the cylinder and the gear pump is always kept tight, whereby the molten resin material is never allowed to leak out. Since the main discharge port of the diverter valve is prevented from shifting from the inhalation port of the gear pump at the joint therebetween, the flow passage at the joint is always smooth without a spot where the molten resin material gathers. The quality of resin products thus becomes stable.

What is claimed is:

1. An extruder comprising:

a speed reducer;

a cylinder having built-in screws coupled to the speed reducer, the screws driven by the speed reducer, a downstream end portion of cylinder secured, an upstream portion slidably connected in a direction of a flow passage of the cylinder; and a gear pump coupled to the cylinder at end portion of the cylinder in such a manner that a direction of a flow passage of the gear pump is set perpendicular to the flow passage of the cylinder.

2. An extruder as claimed in claim 1, wherein the upstream end portion of the cylinder is movable in the direction of the flow passage of the cylinder with respect to the speed reducer.

3. An extruder as claimed in claim 2, wherein the position where the downstream end portion of the cylinder is securely supported is on an axis of the gear pump in the direction of the flow passage of the gear pump.

4. An extruder as claimed in claim 3, wherein the gear pump is movable in the direction the flow passage of gear pump.

* * * * *